United States Patent [19]

Fincher

[11] Patent Number: 5,296,790
[45] Date of Patent: Mar. 22, 1994

[54] MOTOR DRIVEN DAMPING ARRANGEMENT AND METHOD

[75] Inventor: Jeffrey L. Fincher, San Carlos, Calif.

[73] Assignee: Ampex Systems Corporation, Redwood City, Calif.

[21] Appl. No.: 881,017

[22] Filed: May 8, 1992

[51] Int. Cl.[5] .............................................. G05B 11/01
[52] U.S. Cl. ...................................... 318/560; 318/696; 318/460
[58] Field of Search ............... 318/560, 611, 459, 114, 318/434, 475, 460, 696

[56] References Cited

U.S. PATENT DOCUMENTS

| | | |
|---|---|---|
| 3,808,486 | 4/1974 | Cuda et al. . |
| 3,983,318 | 9/1976 | Miller et al. . |
| 4,268,785 | 5/1981 | Svendsen . |
| 4,284,942 | 8/1981 | Bigley et al. . |
| 4,298,833 | 11/1981 | Edwards et al. . |
| 4,358,842 | 11/1982 | Kimura . |
| 4,496,883 | 1/1985 | Eastcott et al. ................. 318/98 X |
| 4,749,927 | 6/1988 | Rodal et al. . |
| 4,851,755 | 7/1989 | Fincher ............................. 318/696 |
| 4,963,804 | 10/1990 | Geiger .............................. 318/460 |
| 4,967,293 | 10/1990 | Aruga et al. . |
| 4,992,715 | 2/1991 | Nakamura et al. ............. 318/649 X |
| 5,111,124 | 5/1992 | Kurosawa . |

OTHER PUBLICATIONS

English version of Chinese (Taiwan) Appln. No. 79,107,532 entitled Feedback Control System.

Primary Examiner—William M. Shoop, Jr.
Assistant Examiner—Karen Masih
Attorney, Agent, or Firm—Richard J. Roddy

[57] ABSTRACT

An arrangement involving apparatus and process damps vibrations, for example, rotary or linear vibrations, in a member to be damped, for example, in a supply tension arm forming part of a tape transport of a digital cassette recording system. The arrangement includes a limited angle torquer motor having an output connected to the member such that the presence of the detected vibrations to be damped imparts corresponding vibrations to the shaft (output) of the motor which, in turn, results in a corresponding back EMF voltage within the motor. A servo circuit connected to the input of the motor is designed to be responsive to the back EMF voltage within the motor, actually to an emulated version of the back EMF voltage, for driving the motor in a way to thereby damp the vibrations within the motor shaft which, in turn, damps the rotary or linear vibrations within the member itself. Approximately 20dBs of attenuation in vibration at the resonant frequency has been shown.

12 Claims, 3 Drawing Sheets

MOTOR DRIVEN DAMPING ARRANGEMENT AND METHOD

BACKGROUND OF THE INVENTION

1. Field of the Invention

The present invention relates to vibration damping and, more particularly, to an active vibration damping arrangement and process which utilizes a motor for damping vibrations such as those found, among other places, within a supply tension arm forming part of a tape transport within a recording system.

2. Description of Related Art

Supply tension arms such as those typically found in recording systems like the DCRSi TM high speed data recorder system marketed by Ampex Data Systems Corporation are known to have a natural resonance (also called a natural vibration or a natural oscillation or a natural frequency in the art). In one recording system, the supply tension arm has been found to have a natural resonance at approximately 130 hertz (Hz). The natural resonance is generally caused by a combination of elements including a mass of the tension arm and a spring constant of a recording tape forming part of the overall recording system. Attempts, which have included the use of grease as well as air dashpots, have been made to damp the resonance. Grease provides some improvement but does not provide consistent damping over time and temperature. Dashpots provide improvement in some areas but problems in other areas. For example, dashpots usually have some mechanical slop and some variation over temperature and humidity which further degrades their performance and hence their effectiveness in damping vibrations.

Accordingly, since known approaches do not provide a significant enough improvement in performance to be considered to be a viable damping solution, alternatives continue to be sought.

SUMMARY OF THE INVENTION

As will be described in more detail hereinafter, the present invention provides a still better approach to damping certain vibrations within a tension arm of a recording system or, for that matter, other members of the recording system that require damping or, for that matter, other members of other systems that require damping. According to the instant approach, a motor such as a limited angle torquer motor can be used to provide the required damping. The output of the motor is connected to the member to be damped, for example, to the supply tension arm of the recording system tape transport, such that the presence within the member of the particular vibrations to be damped is sensed within the motor. A servo circuit responsive to the vibrations sensed within the motor and responsive to a sensed signal at an output of the motor operates the motor in such a way which damps those vibrations.

In a specific illustrative embodiment of the present invention, an output of a limited angle torquer motor is connected to the supply tension arm or to such other member which is to have its vibrations be damped such that the presence of the vibrations to be damped produces a functionally related back EMF within the motor. The back EMF is provided as a sensed signal at the output of the motor. The servo circuit includes means for reducing the back EMF as it is produced to thereby damp the particular vibrations in question.

The damping is accomplished when the servo circuit produces a voltage which emulates the back EMF voltage. By processing this produced voltage in particular ways that are hereinafter described and by using this processed emulated voltage, the back EMF voltage is decreased when the motor is electrically driven in a clockwise or counter-clockwise direction, whichever direction is opposite to the direction of the vibration. Stated in an alternative way, the back EMF voltage is used as an indication of rotary vibration. A control voltage is derived responsive to the back EMF such that, when the control voltage is applied across the motor windings, a torque is generated within the motor which opposes the angular motion of the rotor and effectively damps its vibration. The damped vibration results in a suitably diminished back EMF.

As will also be described in more detail hereinafter, the principles of the present invention are not limited to damping rotary vibrations but extend to damping lateral vibrations as well as other kinds of multi-dimensional vibrations.

BRIEF DESCRIPTION OF THE DRAWINGS

The present invention will be described in more detail hereinafter in conjunction with the drawings, wherein.

DETAILED DESCRIPTION

Figure 1:
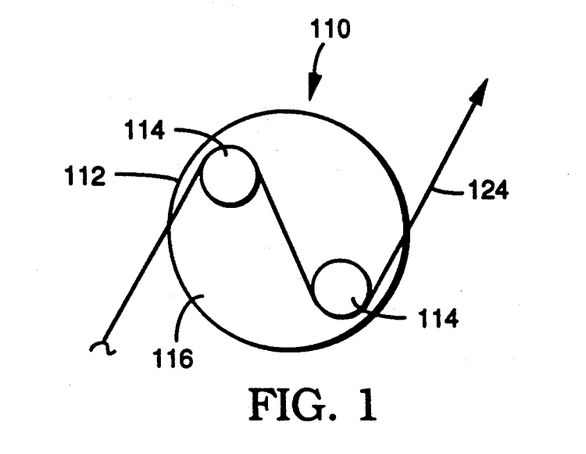
FIG. 1 is a diagrammatic illustration, in partial end view, of a typical tension arm forming part of, for example, a recording system tape transport, the tension arm being shown in combination with a section of recording tape.
Figure 2:
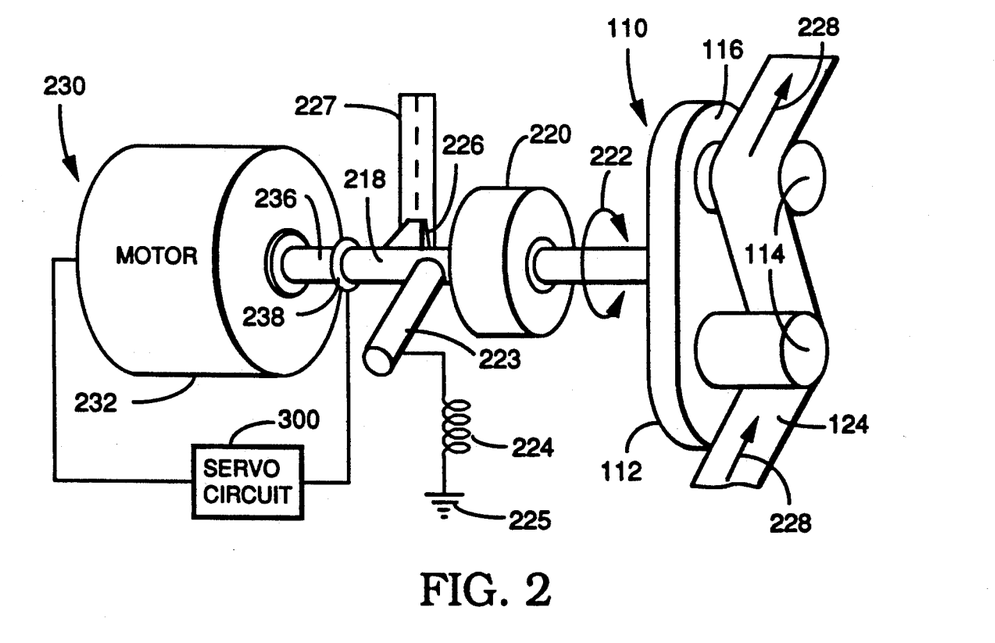
FIG. 2 is a diagrammatic illustration, in perspective view, of a circularly vibrating member such as might include a tension arm and the recording tape illustrated in FIG. 1 in combination with an arrangement designed in accordance with the present invention for damping certain rotary vibrations within the tension arm.

Turning now to the drawings, attention is first directed to FIGS. 1 and 2 which depict a member to be damped, which for purposes of illustration only and not by way of limitation is shown as supply tension arm 110, which forms part of a recording system tape transport. This supply tension arm 110 which, in and of itself is well known in the art, includes a roller support plate 112, a pair of spaced apart and offset rollers 114, each of which is rotatably mounted to the front face 116 of the roller plate 112, and a support shaft 218. The support shaft 218 is supported by suitable means including a conventional and readily providable bearing assembly 220 for back and forth rotational movement about the axis of the shaft, as indicated by the two way angular arrow 222. This, in turn, allows the roller plate 112 and rollers 114 to angularly rotate back and forth as the tension changes on the recording tape 124 which is threaded between the rollers 114 as it moves from its supply arm towards its take up reel.

A purpose of tension arm 110 is to provide tape tension feedback to an associated supply reel or an associated take up reel (neither reel is shown) of the recording system tape transport. To this end, shaft 218 supports a light emitting diode or other suitable light source 226 which projects a light beam onto a cooperating photoresistor 227, both of which together form a photo potentiometer 226, 227. This potentiometer 226, 227 is part of a feedback circuit for controlling the operation of the take up reel or the supply reel associated with the tension arm 110 in order to maintain a relatively constant tension on the recording tape 124. So long as that is the case, tension arm 110 will remain in a fixed position, for example, the position illustrated in FIG. 2. However, if the tension on tape 124 rises above a desired level, the tension arm 110 will rotate counter-clockwise (as viewed in FIG. 1 from the front of the tension arm) or clockwise (as viewed in FIG. 2 where for generality tape 124 is illustrated on an opposite side of roller 114 vis-a-vis the side shown in FIG. 1) in order to accommodate this rise in tension. If, on the other hand, the tension on tape 124 falls below its desired level, the tension arm 110 will rotate clockwise (as viewed in FIG. 1 from the front of the tension arm) or counter-clockwise (as viewed in FIG. 2) in order to accommodate this change in tension. In the illustration of FIG. 2, the particular pattern of rotational movement of the tension arm assumes that the tape is moving in the direction indicated by arrows 228. Note that this reciprocating movement of the tension arm causes its shaft 218 to reciprocate in a corresponding direction. This, in turn, causes the resistance of the photo potentiometer 226, 227 to change proportionately. As a result, either the supply reel of tape or the take up reel for the tape, whichever is in the circuit with the tension arm 110, changes the way it feeds the recording tape until the tension arm 110 is brought back to its initial position in order to maintain the desired tension on tape 124. It is worth pointing out that there is typically a tension arm spring 224 connected between a moment arm 223 that is typically affixed to shaft 218 and the tape transport chassis shown as 225. Tension arm spring 224 functions in establishing the tape tension. The amount of tape tension is directly related to the particular angular position of the tension arm 110, that is, as the angle becomes larger (or smaller) then the tension arm spring 224 expands or contracts to exhibit a larger (or smaller) tension, or force, on the tape.

As a result of the way in which some recording systems typically operate, for example, digital cassette recording systems, a recording tape reciprocates or vibrates back and forth during the recording mode at relatively high accelerations. This, in turn, tends to impart undesired rotary vibrations to shaft 218. At the same time, when the recorder is placed in certain environments, for example, within an airborne aircraft, additional undesired rotary vibrations may be imparted to shaft 218. Unfortunately, the extension (or enlargement) of the tension servo bandwidth to a width sufficient to damp these vibrations has not been found to be practical. Further and as stated previously, grease and air dashpots have other drawbacks.

Figure 4:
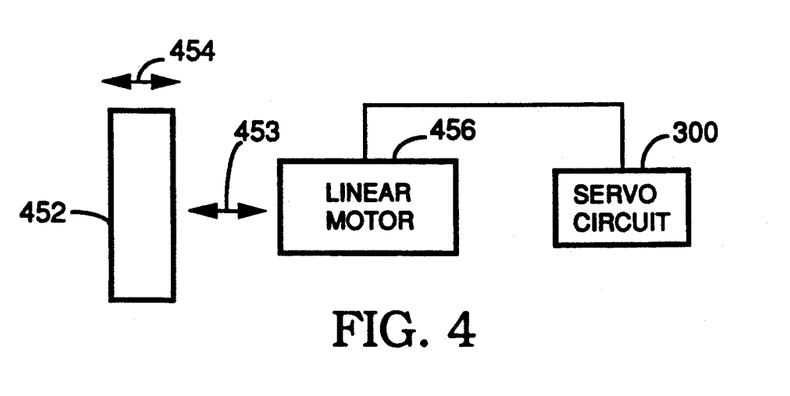
FIG. 4, which show lateral motion, as contrasted with FIG. 2, which shows rotary motion, is a diagrammatic illustration, in elevation view, of a laterally vibrating member in combination with an arrangement designed in accordance with the present invention for damping certain lateral vibrations of that member.

Therefore, a new and different arrangement designed in accordance with the present invention is provided for damping, in one embodiment, the undesired rotary vibrations within shaft 218. Approximately 20 decibels (dBs) of attenuation in vibration at the resonant frequency has been shown. In the one embodiment, as will be described in more detail hereinafter, an arrangement for damping undesired rotary vibrations within shaft 218 is generally indicated in FIG. 2 by the reference numeral 230 and includes a motor 232 and a cooperating servo circuit generally indicated at 300. Further, in a second embodiment, and as will also be described in more detail hereinafter, an alternative arrangement for damping undesired lateral vibrations within shaft 458 is generally indicated in FIG. 4 as including a motor 456 and a cooperating servo circuit generally indicated at 300.

Still referring to FIG. 2 in particular, motor 232, which, for purposes of illustration only and not by way of limitation, could be a direct current (DC) specialized limited angle torquer motor, is shown including an output shaft 236 which is coaxially connected for reciprocating rotation with tension arm shaft 218 by suitable coupling means, which is generally indicated at 238 and which could be a weld or an alternative sleeve device for coupling the output shaft 236 of motor 232 with the support staff 218 of tension arm 110. Thus, the undesired rotary vibrations within support shaft 218 are imparted to motor output shaft 236 and, as motor shaft 236 vibrates, a functionally related back electromotive force, also called a back EMF voltage in the art, is produced or generated within the motor 232, as is well known to those familiar with the operation of such a motor. Of course, in the absence of these undesired rotary vibrations within coupled shafts 218 and 236, no back EMF voltage is produced within the motor 232. On the other hand, when the rotary vibrations are present within coupled shafts 218 and 236, there is produced a resulting back EMF voltage within motor 232. By electrically driving motor 232 to produce a torque which opposes the vibrations on the rotor of the motor 232 and, in any event, by reducing the back EMF voltage, the rotary vibrations on motor output shaft 236 can be damped, thereby damping the rotary vibrations within support shaft 218 of tension arm 110 through connected coupling means 238. As will be seen hereinafter, it is a function of servo circuit 300 to electrically drive the motor 232 to produce a resulting torque which opposes the rotational motion of the motor 232, which, in turn, results in a reduction of any back EMF voltage and which results is a damping of the undesired rotary vibrations within tension arm support shaft 218 by way of its coupled motor shaft 236. The way this is accomplished will be described immediately below in conjunction with FIG. 3.

Figure 3:
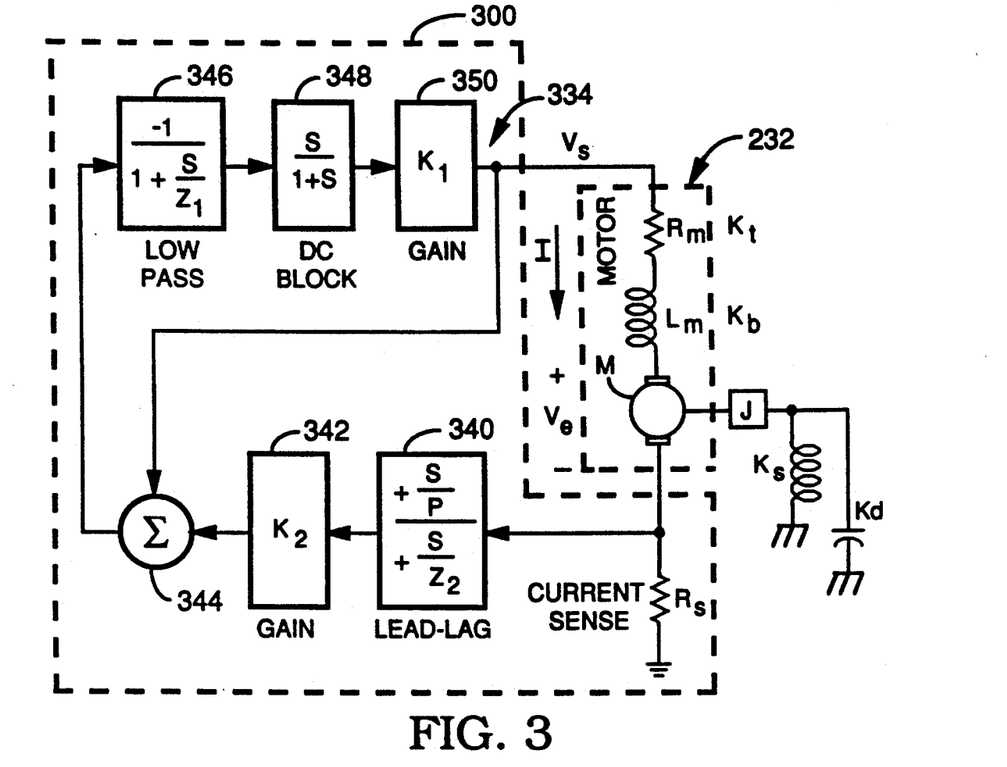
FIG. 3 schematically illustrates a motor in combination with a servo circuit, which together form either of the damping arrangements shown in FIGS. 2 and 4.

Turning now to FIG. 3, attention is directed to a schematic illustration of servo circuit 300 in combination with motor 232 which, for purposes of this discussion, has been divided into three components. As illustrated in FIG. 3, those components include the motor's electrical resistance Rm, the motor's electrical inductance Lm, and the motor's back EMF generator, represented by voltage source M. The generated back EMF voltage is represented by Ve. Because of the presence of inductance Lm, it can be said that the motor 232 includes reactive impedance. The motor torque constant is represented by Kt and the motor back EMF constant is represented by Kb.

In addition, for purposes of completeness, certain physical constraints of motor 232 are also illustrated in FIG. 3. Specifically, there are illustrated several physical parameters including the tension arm inertia represented by J, the spring constants of the recording tape and the tension arm spring can be joined for these purposes (because the tension arm spring constant is typically so small in comparison with the recording tape spring constant) and the joined spring constants can be represented by the single spring constant Ks, and the internal bearing and motor damping represented by Kd. The values of these physical parameters will vary from motor to motor as well as from tape transport to tape transport. In any event the values of these physical parameters need to be taken into account when designing servo circuit 300.

As discussed above, the presence of any rotary vibrations within the coupled shafts 218 and 236 results in a back EMF voltage being generated within motor 232, actually within its windings. This back EMF voltage is represented in FIG. 3 by an ideal voltage source M with a voltage Ve in series with an equivalent output impedance represented by Rm and Lm. The motor back EMF voltage is equal to the product of the motor's rotational speed and the motor back EMF constant Kb. At the same time and as will be discussed hereinafter, a control input to motor 232 is a drive or supply voltage Vs which is applied across the motor 232 by means of servo circuit 300. The voltage Vs and Ve applied across resistor Rm and inductor Lm plus the small voltage across current sensing resistor Rs result in a motor current I that is generally in the direction indicated by the arrow in FIG. 3. The torque generated by the motor is equal to the product of the motor current I and the motor torque constant Kt. Thus, the overall drive or supply voltage Vs across the motor 232 is comprised of the voltage across the motor's reactive impedance (its resistance Rm and its inductance Lm) plus the back EMF voltage Ve, which, of course, could have a value of zero volts, for example, when there is no rotary motion plus the voltage resulting from the passage of current through current sensing resistor Rs. This separation of the voltage components within the motor 232 is important to keep in mind for the discussions to follow.

The servo circuit 300 includes motor current sensing resistor Rs connected between the output of DC motor 232 and ground to lead-lag The servo circuit 300 includes motor current sensing resistor Rs connected between the output of DC motor 232 and ground to lead-lag circuitry 340 and thence through gain circuitry 342 to a subtracting input of the summing circuit 344, whose output is connected through the low pass filter circuit 346, the DC blocking circuit 348, and finally, motor driver gain circuitry 350, all of which are connected together in the manner illustrated in FIG. 3. Also, the symbol "s" shown within blocks 310, 346 and 348 represents the LaPlace transformation operator while the function shown within the blocks is the LaPlace transform function of the block.

The overall drive or supply voltage Vs across the motor 232 is provided as an output of motor driver gain circuitry 350 jointly to an adding input of the summing circuit 344 and to motor 232 to develop the opposing torque to damp any rotary vibrations imparted to the coupled shafts 218 and 236. Before actually describing the way in which these various circuit components, which comprise overall servo circuit 300, function to reduce back EMF voltage Ve when the latter is present, and to hence damp any rotary vibrations within the coupled shafts 218 and 236, it is important to recognize that each of these circuit components is well known in the art and, hence, will only be described herein by its functional contribution to the overall servo circuit 300. Based on the teachings herein, one with ordinary skill in the art can readily provide each of these circuit components and thus overall servo circuit 300. In this regard, it becomes necessary to take into account the physical parameters J, Ks and Kd of the particular motor 232 and tape 124 used in a specific embodiment so as to establish the correct values for the various circuit components that comprise servo circuit 300.

Having described direct current (DC) specialized limited angle torquer motor 232 and the various components making up servo circuit 300, attention is now directed to the way in which the servo circuit 300 is used to damp the rotary vibrations within the coupled shafts 218 and 236, the shafts being involved in generating the back EMF voltage and the back EMF voltage Ve being involved in detecting those vibrations.

At the outset, it should be noted that a control input to motor 232 is a source or driver voltage Vs from a suitable source forming an output of gain circuitry 350. This source or driver voltage Vs is applied across motor 232, thereby producing motor current I generally in the direction illustrated in FIG. 3. As stated above, motor current I results in voltages across each of the motor's impedance elements (i.e. resistance Rm and inductance Lm), which together may be referred to as a motor's reactive impedance voltage. The combination of the motor's reactive impedance voltage plus the back EMF voltage Ve, if any, plus the voltage $V_{Rs}$ across the current sensing resistor Rs make up the drive voltage Vs. As will be clear from the description herein, servo circuit 300 uses the motor current I as a means for producing a voltage which emulates the back EMF voltage Ve, if the latter is present. This is because the back EMF voltage Ve, once emulated, is filtered, inverted, amplified and ultimately applied across the motor 232 as voltage Vs in order to oppose the actual back EMF voltage, thereby driving it towards zero and thus ultimately damping the vibrations within shaft 218 of tension arm 110.

The following description is useful to illustrate a specific way in which servo circuit 300 operates in this illustrative embodiment to provide the functions as herein described.

A controlled input to the motor 232 is the source or driver voltage Vs and an observable response is the motor current I in the presence of back EMF voltage Ve, as described previously. Servo circuit 300 senses this current I through current sensing resistor Rs. The resultant voltage $V_{Rs}$ across current sensing resistor Rs is passed through lead-lag circuitry 340 onto gain circuitry 342. Circuits 340 and 342 act on the voltage across current sensing resistor Rs such that the voltage at the output of gain circuitry 342 emulates the voltage drop $V_{Rm}$ across resistor Rm and the voltage drop $V_{Lm}$ across inductor Lm within motor 232 and the voltage drop $V_{Rs}$ resistor Rs, that is:

$$Vs = V_{Rm} + V_{Lm} + Ve + V_{Rs} \tag{1}$$

and $$Ve = Vs - (V_{Rm} + V_{Lm} + V_{Rs}) \tag{2}$$

Specifically, the lead element, which is the numerator shown in circuit 340, and the gain of circuit 342 represent the motor reactance while the lag element, which is the denominator shown in circuit 340, stops the lead and allows for circuit realization and adapts for noise considerations. (In my studies, I have found a lead element having a frequency of about 702 Hz, which is determined by the motor reactance, and a lag element having a frequency of about ten times the lead frequency is acceptable.) The voltage output from gain circuit 342 is subtracted from the source or drive voltage Vs by means of summing circuitry 344 so that the voltage at the output of summing circuitry 344 is an estimation of the back EMF voltage Ve and is shown by equation (2) above. The estimated voltage, which is an emulation of the back EMF voltage, is then inverted by means of low pass circuitry 346. It is then low pass filtered by the same circuitry 346 to remove noise and define its frequency response. (In my studies, I have found it acceptable to design circuit 346 with a 3 dB point at about 1,000 Hz.) It is then filtered by means of DC blocking circuitry 348 to remove any standing torque offset on the motor 232. Finally, it is passed through gain circuitry 350 after which it is applied to the motor windings as the source or driver voltage Vs in order to oppose the motion of the motor 232 and to reduce the back EMF voltage Ve, which thereby damps the rotary vibrations detected on coupled shafts 218 and 236. Note that the presence of the back EMF voltage Ve is evidence that there are rotary vibrations on coupled shafts 218 and 236 and, hence, the detection of the back EMF voltage Ve is equivalent to the detection of rotary vibrations on coupled shafts 218 and 236.

The foregoing has been a description of the way in which a specialized limited angle torquer motor 232 and a servo circuit 300 work together to form an arrangement which effectively damps certain rotary vibrations within a tension arm 110 forming part of a tape recorder. As indicated previously, the various components comprising the servo circuit 300 are themselves readily providable and, in view of the teachings herein, they can be readily combined to provide the servo circuit function described above. The specialized motor referred to as a limited angle torquer is especially suitable for the present application. It is designed to have smooth torque characteristics over a limited angle of rotation which may vary from a few degrees to 180 degrees in either angular direction. For example, motor 232 may be an Inland QT-0707-B motor, which is relatively small in size and weight but yet has relatively good torque characteristics. It is a brush motor whose rotor can be hard wired. Advantageously, in the course of experimentation and computer simulations, it was discovered that the additional mass of the motor lowered the undamped system resonance from about 130 Hz to about 120 Hz. Some further parameters, which I found to provide acceptable results, include:

| | |
|---|---|
| $K_d$ | = 0.0083 ounce inches seconds per radian |
| | = 0.0059 newton centimeter seconds per radian |
| | = $5.9 \times 10^{-5}$ newton meter seconds per radian |
| $K_s$ | = 335 ounce inches per radian |
| | = 237 newton centimeters per radian |
| | = 2.37 newton meters per radian |
| J | = $5.9 \times 10^{-4}$ ounce inches second second |
| | = $4.7 \times 10^{-2}$ gram centimeter second second |
| | = $4.7 \times 10^{-7}$ kilogram meter second second |
| Lm | = 3.4 milli-henries |
| Rm + Rs | = 15 ohms |
| $K_1$ | = 25 |
| $K_2$ | = 15 |
| $Z_1$ | = $159.2 \times 10^{-6}$ (or 1,000 Hz) |
| $Z_2$ | = $22.67 \times 10^{-6}$ (or 7,020 Hz) |
| P | = $226.7 \times 10^{-6}$ (or 702 Hz) |

-continued

| | |
|---|---|
| $K_t$ | = 4.06 ounce inches per ampere |
| | = 2.87 newton centimeters per ampere |
| | = $2.87 \times 10^{-2}$ newton meters per ampere |
| $K_b$ | = 0.029 volt seconds per radian |

Figure 5:
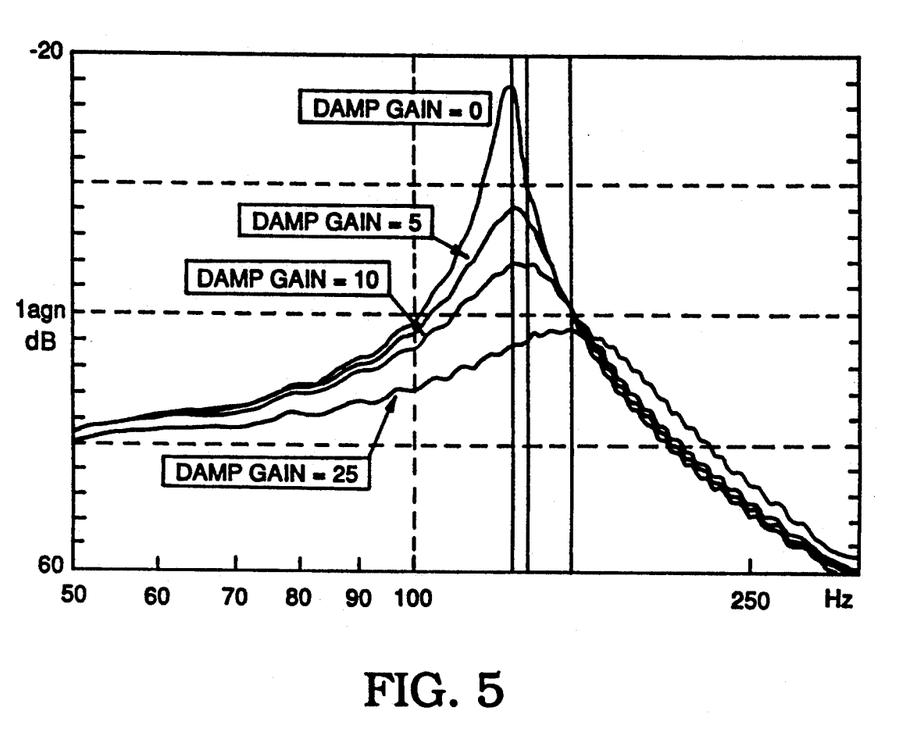
FIG. 5 illustrates a frequency response characteristic of a computer model simulation of a damping arrangement and method made using the principles of my invention.

Further simulation of the damping arrangement and method aforedescribed was done. Sinusoidal torque disturbances, which are the simulated stimuli to produce a scenario of vibrations to be damped, were applied to a computer simulation model. The model assumed sinusoidal torque disturbances having a peak amplitude of about one ounce-inch and simulated its frequency response over a range of frequencies from 50 Hz through 250 Hz with different values of gain $K_1$ provided by motor driver gain circuitry 350. FIG. 5 is included to show the frequency response obtained in the simulation studies.

As previously mentioned, it is to be further understood that the present invention is not limited to damping rotary vibrations within the tension arm of a tape transport of a tape recorder. The present invention contemplates damping rotary motion with the shafts of other apparatus as well. Moreover, the present invention is not limited to the damping of rotary vibrations. As illustrated in FIG. 4, a member to be damped 452 is shown containing lateral vibrations diagrammatically depicted by the two way arrow 454. A readily providable linear motor generally indicated at 456 has its output shaft 458 suitable coupled with member 452 such that the lateral vibrations within the member 452 are imparted to shaft 458. These latter vibrations result in a back EMF voltage within the windings (not shown) within motor 456. The same servo circuit 300 described previously may be provided in combination with motor 456 in order to reduce the resultant back EMF voltage to thereby damp the vibrations within shaft 458 and thus damp the vibrations within member 452.

The foregoing description of the principles of may invention is by way of illustration only and not by way of limitation. For example, although several illustrative embodiments of a damping arrangement and method in accordance with the principles of my invention have been shown and described, other alternative embodiments are possible and would be clear to one skilled in the art upon an understanding of the principles of my invention. Certainly the principles of my invention have utility apart from damping rotary or linear vibrations. For example, combinations of rotary and linear vibrations can also be damped and could benefit from the application of the principles of my invention. Accordingly, the scope of my invention is to be limited only by the appended claims.

What is claimed is:

1. Apparatus for damping vibrations within a member to be damped, comprising:
    (a) motor means including
        a motor output shaft connected to the member such that vibrations within the member are detected by the motor output shaft and
        EMF generating means responsive to the detected vibrations for generating a corresponding back EMF voltage; and
    (b) servo circuit means connected to an input of the motor and responsive to the back EMF voltage generated by the motor means for electrically driving the motor means whereby the vibrations detected by the motor output shaft are damped.

2. Apparatus according to claim 1 wherein the servo circuit means includes:
means for producing a voltage which emulates the back EMF voltage and
means coupled to the input of the motor and responsive to the emulated EMF voltage for applying to the input of the motor a drive voltage which damps vibrations in the member resulting in a reduction of the back EMF voltage.

3. Apparatus for damping vibrations within a member to be damped, comprising:
(a) motor means including
a motor output shaft connected to the member such that vibrations within the member are detected by the motor output shaft and
EMF generating means responsive to the detected vibrations for generating a corresponding back EMF voltage; and
(b) servo circuit means connected to an input of the motor and responsive to the back EMF voltage generated by the motor means for electrically driving the motor means whereby the vibrations detected by the motor output shaft are damped and wherein the servo circuit means includes:
means for producing a voltage which emulates the back EMF voltage and
means coupled to the input of the motor and responsive to the emulated EMF voltage for applying to the input of the motor a drive voltage which damps vibrations in the member resulting in a reduction of the back EMF voltage and
wherein the means for producing the emulated voltage includes:
means for sensing current through the motor means,
means responsive to the sensed current for producing an output voltage which emulates a voltage within a reactive and a passive impedance of the motor means and within the current sensing means, and
means responsive to the output voltage and to the drive voltage for producing the back EMF emulated voltage.

4. Apparatus according to claim 1 wherein the vibrations are rotary vibrations within the member to be damped and wherein the motor means comprises a rotary motor.

5. Apparatus for damping vibrations within a member to be damped, comprising:
(a) motor means including
a motor output shaft connected to the member such that vibrations within the member are detected by the motor output shaft and
EMF generating means responsive to the detected vibrations for generating a corresponding back EMF voltage; and
(b) servo circuit means connected to an input of the motor and responsive to the back EMF voltage generated by the motor means for electrically driving the motor means whereby the vibrations detected by the motor output shaft are damped and wherein the vibrations are rotary vibrations within the member to be damped and wherein the motor means comprises a rotary motor and wherein the rotary motor includes a direct current (DC) specialized limited angle torquer motor.

6. Apparatus for damping vibrations within a member to be damped, comprising:
(a) motor means including
a motor output shaft connected to the member such that vibrations within the member are detected by the motor output shaft and
EMF generating means responsive to the detected vibrations for generating a corresponding back EMF voltage; and
(b) servo circuit means connected to an input of the motor and responsive to the back EMF voltage generated by the motor means for electrically driving the motor means whereby the vibrations detected by the motor output shaft are damped and wherein the certain vibrations comprise lateral vibrations within the member to be damped and wherein the motor comprises a linear motor.

7. Apparatus for damping vibrations within a member to be damped, comprising:
(a) motor means including
a motor output shaft connected to the member such that vibrations within the member are detected by the motor output shaft and
EMF generating means responsive to the detected vibrations for generating a corresponding back EMF voltage; and
(b) servo circuit means connected to an input of the motor and responsive to the back EMF voltage generated by the motor means for electrically driving the motor means whereby the vibrations detected by the motor output shaft are damped and wherein the member to be damped comprises a shaft of a tension supply arm forming part of a tape transport of a recorder.

8. Apparatus for damping vibrations within a member to be damped comprising:
(a) a DC motor having an output shaft coupled to the member such that a presence or an absence of vibrations within the member can be sensed by the output shaft of the motor; and
(b) means responsive to the vibrations sensed by the motor for operating the motor in a way which damps those vibrations.

9. Apparatus according to claim 8 wherein the output of the DC motor is connected to the member and the motor operating means comprises
means responsive to the sensed presence of the vibrations for producing a functionally related back EMF within the motor and
means responsive to the back EMF for electrically driving the motor to oppose the sensed vibration.

10. An apparatus according to claim 9 wherein the member comprises a shaft of a tension supply arm forming part of a tape transport of a recorder.

11. A method of damping vibrations within a member to be damped, comprising:
coupling the member to be damped to an output shaft of a motor;
detecting vibrations within the member;
responsive to detected vibrations in the member, producing a functionally related back EMF within the motor;
responsive to the back EMF, generating a torque within the motor to oppose the detected vibration;
responsive to the opposing torque, damping the vibrations.

12. The method defined in claim 11 further comprising the step of:
responsive to the damped vibrations, reducing the back EMF.

* * * * *

UNITED STATES PATENT AND TRADEMARK OFFICE
CERTIFICATE OF CORRECTION

PATENT NO. : 5,296,790

DATED : March 22, 1994

INVENTOR(S) : Jeffrey L. Fincher

It is certified that error appears in the above-identified patent and that said Letters Patent is hereb corrected as shown below:

The title page, showing an illustrative figure, should be deleted and substitute therefor the attached title page.

Delete Figures 3 and 5, and substitute therefor the drawings sheets, consisting of Figs 3 and 5, as shown on the attached pages.

Signed and Sealed this

Seventeenth Day of January, 1995

*Attest:*

BRUCE LEHMAN

*Attesting Officer*    *Commissioner of Patents and Trademarks*

United States Patent
Fincher

[11] Patent Number: 5,296,7[90A]
[45] Date of Patent: Mar. 22, 19[94]

[54] MOTOR DRIVEN DAMPING ARRANGEMENT AND METHOD

[75] Inventor: Jeffrey L. Fincher, San Carlos, Calif.
[73] Assignee: Ampex Systems Corporation, Redwood City, Calif.
[21] Appl. No.: 881,017
[22] Filed: May 8, 1992
[51] Int. Cl.⁵ ................................. G05B 11/01
[52] U.S. Cl. ......................... 318/560; 318/696; 318/460
[58] Field of Search ........ 318/560, 611, 459, 114, 318/434, 475, 460, 696

[56] References Cited

U.S. PATENT DOCUMENTS

| | | |
|---|---|---|
| 3,808,486 | 4/1974 | Cuda et al. |
| 3,983,318 | 9/1976 | Miller et al. |
| 4,268,785 | 5/1981 | Svendsen |
| 4,284,942 | 8/1981 | Bigley et al. |
| 4,298,833 | 11/1981 | Edwards et al. |
| 4,358,842 | 11/1982 | Kimura |
| 4,496,883 | 1/1985 | Eastcott et al. ............ 318/98 X |
| 4,749,927 | 6/1988 | Rodal et al. |
| 4,851,755 | 7/1989 | Fincher ..................... 318/696 |
| 4,963,804 | 10/1990 | Geiger ....................... 318/460 |
| 4,967,293 | 10/1990 | Aruga et al. |
| 4,992,715 | 2/1991 | Nakamura et al. ......... 318/649 X |
| 5,111,124 | 5/1992 | Kurosawa |

OTHER PUBLICATIONS

English version of Chinese (Taiwan) Appln. [No.] 79,107,532 entitled Feedback Control System.

Primary Examiner—William M. Shoop, Jr.
Assistant Examiner—Karen Masih
Attorney, Agent, or Firm—Richard J. Roddy

[57] ABSTRACT

An arrangement involving apparatus and proc[ess] damps vibrations, for example, rotary or linear vib[ra]tions, in a member to be damped, for example, i[n a] supply tension arm forming part of a tape transport o[f a] digital cassette recording system. The arrangem[ent] includes a limited angle torquer motor having an out[put] connected to the member such that the presence of detected vibrations to be damped imparts correspo[nd]ing vibrations to the shaft (output) of the motor whi[ch,] in turn, results in a corresponding back EMF volt[age] within the motor. A servo circuit connected to the in[put] of the motor is designed to be responsive to the b[ack] EMF voltage, actually to an emula[ted] version of the back EMF voltage, for driving the mo[tor] in a way to thereby damp the vibrations within [the] motor shaft which, in turn, damps the rotary or lin[ear] vibrations within the member itself. Approximat[ely] 20dBs of attenuation in vibration at the resonant f[re]quency has been shown.

12 Claims, 3 Drawing Sheets

UNITED STATES PATENT AND TRADEMARK OFFICE
CERTIFICATE OF CORRECTION

PATENT NO. : 5,296,790　　　　　　　　　　　　　Page 3 of 4
DATED　　　: March 22, 1994
INVENTOR(S) : Jeffrey L. Fincher It is certified that error appears in the above-identified patent and that said Letters Patent is hereby corrected as shown below:

In the drawings Fig. 3 should appear as follows:

FIG. 3

UNITED STATES PATENT AND TRADEMARK OFFICE
CERTIFICATE OF CORRECTION

PATENT NO. : 5,296,790
DATED : March 22, 1994
INVENTOR(S) : Jeffrey L. Fincher

It is certified that error appears in the above-indentified patent and that said Letters Patent is hereby corrected as shown below:

In the drawings, Fig. 5 should appear as follows:

FIG. 5